United States Patent [19]

Wolde-Michael

[11] 4,422,931
[45] Dec. 27, 1983

[54] OIL CONCENTRATOR

[76] Inventor: Girma Wolde-Michael, 100 Canabury Ct., Little Canada, Minn. 55117

[21] Appl. No.: 368,648

[22] Filed: Apr. 15, 1982

[51] Int. Cl.³ .................... B01D 21/10; B01F 3/04; C02F 1/24
[52] U.S. Cl. .................. 210/168; 210/221.2; 210/519; 210/532.1; 210/540
[58] Field of Search ............ 210/167, 168, 202, 221.2, 210/320, 519, 532.1, 537, 540

[56] References Cited

U.S. PATENT DOCUMENTS

| 911,314 | 2/1909 | Maranville | 210/540 |
|---|---|---|---|
| 1,645,093 | 10/1927 | Comyn | 210/532.1 |
| 1,889,601 | 11/1932 | Heinkel | 210/532.1 |
| 2,284,737 | 6/1942 | Hirshstein | 210/540 X |
| 2,473,297 | 6/1949 | Parker | 210/522 X |
| 2,782,929 | 2/1957 | Colket | 210/540 X |
| 3,161,590 | 12/1964 | Weis et al. | 210/221.1 |
| 3,216,573 | 11/1965 | Iron | 210/532.1 X |
| 3,355,023 | 11/1967 | Foster | 210/22.1 X |
| 3,804,252 | 4/1974 | Rishel | 210/532.1 X |
| 3,849,311 | 11/1974 | Jakubek | 210/521 X |
| 3,894,949 | 7/1975 | Enzmann | 210/540 X |
| 3,933,654 | 1/1976 | Middelbeek | 210/521 |
| 4,111,805 | 9/1978 | Van Pool et al. | 210/522 |
| 4,123,365 | 10/1978 | Middelbeek | 210/521 |
| 4,145,286 | 3/1979 | Bereskin et al. | 210/540 X |
| 4,202,778 | 5/1980 | Middelbeek | 210/522 |
| 4,366,058 | 12/1982 | Wolde-Michael | 210/320 X |

FOREIGN PATENT DOCUMENTS 311540 3/1919 Fed. Rep. of Germany ...... 210/540

Primary Examiner—Robert H. Spitzer
Attorney, Agent, or Firm—Merchant, Gould, Smith, Edell, Welter & Schmidt

[57] ABSTRACT

In an apparatus for efficiently and thoroughly cleaning tramp oil and contaminants from machine coolant; a tank 12 having three compartments 32, 52 and 66 with a quietener baffle 58 located between the first compartment 32 and the main compartment 52, a torturous path between the main compartment 52 and the clean coolant storage compartment 66, and an agglomeration baffle 76 between the main and storage compartments 52, 66, respectively, is provided. Further, the flow quietener baffle 76 is arranged within the tank 12 so that material flowing from the first compartment 32 to the main compartment 52 will flow generally down the quietener baffle 58 and arrive in the main compartment 52, substantially at the level of the interface 46 between the floating light material 42 and the heavy material 44 with a minimum of disturbance to interface 46. Rapid and complete floatation of oily material containing heavy contaminants is achieved by the addition of aeration bubbles 62 within the first compartment 32.

12 Claims, 5 Drawing Figures

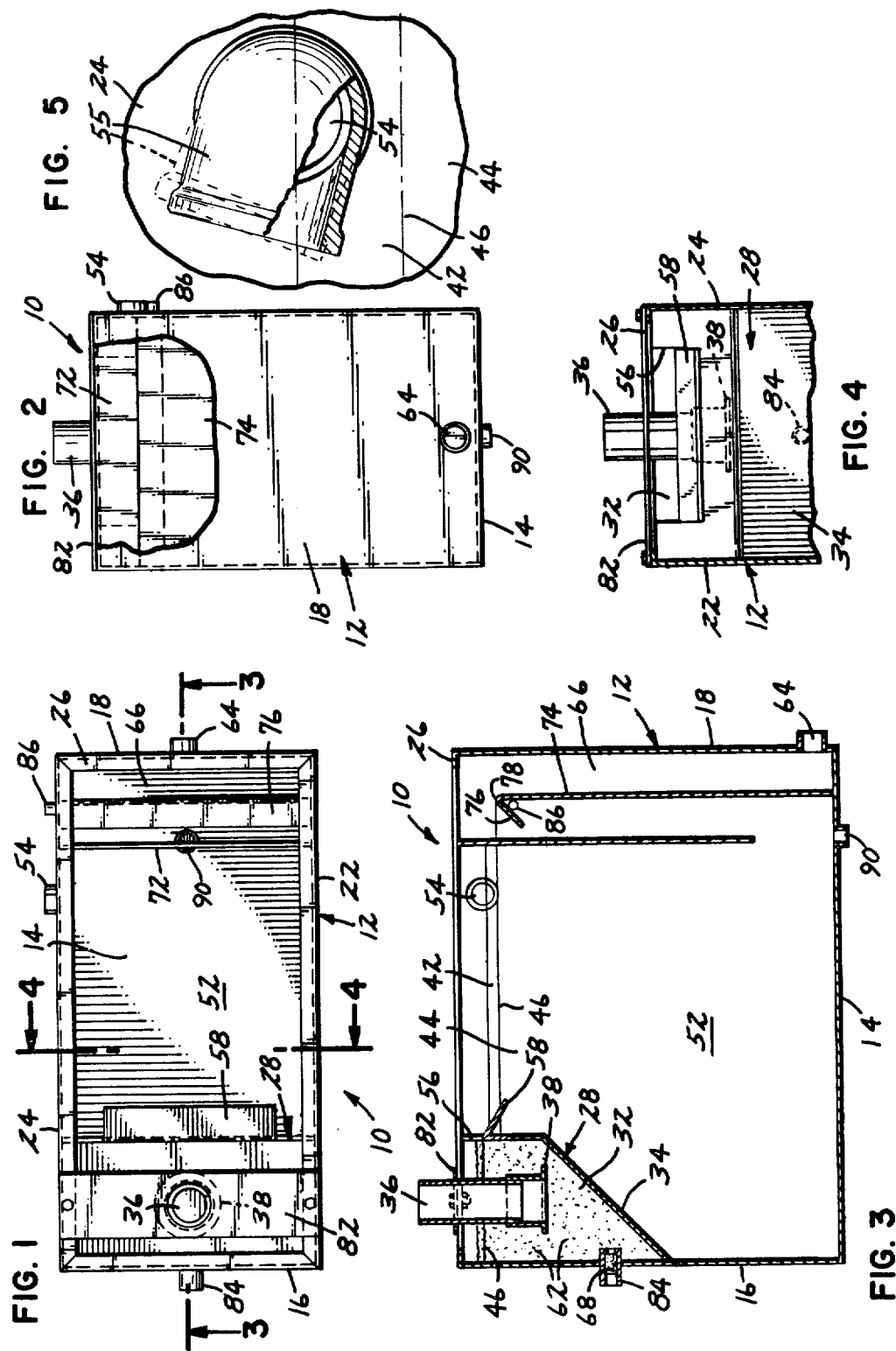

OIL CONCENTRATOR

TECHNICAL FIELD

The present invention relates to apparatii used for removing and concentrating oily contaminants from a fluid, and more particularly to an apparatus for removing oily contaminants, and oil globular entrained fines from machine coolant in order to reclaim and reuse the coolant.

BACKGROUND OF THE INVENTION

Devices for removing oil from fluids are generally known in the art, as are devices for removing solid particles suspended within a fluid. Many of these devices include the use of torturous fluid paths to encourage the separation of fluids of differing specific gravities. Other devices within this field employ large settling tanks for the separation of solid material from the fluid.

There are, however, recurring problems with the use of such tanks and systems for the separation of oily contaminants from machine coolant. These problems include the fact that a complicated structure for passing a fluid through a torturous path will necessarily be complicated to clean, and thus will more easily allow bacteria to accumulate within the oil concentrator. Further, the settling out of particulate matter increases the contaminant content within the oil concentrator thus reducing the cleaning efficiency of the mechanism.

The preferred embodiment of the present invention overcomes these difficulties by employing a rather simple torturous path which is easy to clean and provides little area for bacteria to grow, with a cleaning action which encourages particulate matter to float to the surface and thus be removed with the oily contaminant.

The fact that certain materials of differing specific gravities will separate themselves within a chamber is also known within the background of oil separators. The present invention is directed to providing a mechanism which encourages a thorough cleaning of machine coolant by efficiently removing the majority of contaminants from the coolant. This is accomplished by allowing the materials to separate according to the specific gravity of the various materials with the "light" material of lower specific gravity being skimmed from the surface of the "heavy" material of higher specific gravity. The present invention also provides an apparatus which will encourage the rapid separation of materials within a tank.

The removal of oil contaminants from the coolant is necessary as these substances often harbor bacteria which degrade the machine coolant and cause an unpleasant odor. As the coolant is expensive to produce and expensive to dispose of for environmental reasons, there is a need to extend the useful life of the machine coolant by efficiently and economically removing the tramp oil, metal fines, and other contaminants from the coolant.

The use of machine coolant including cutting oil and the like to cool cutting tools in industry is well known. The present invention is part of a complete machine coolant recovery system including a series of settling tanks for removing large particles and solid materials and an ultracentrifuge employed for removing smaller suspended particles and mechanically emulsified oil from the coolant. Following these steps, the fluid mixture entering the oil concentrator will, however, contain a quantity of tramp oil. This oil finds its way into the machine coolant from leaks within the machine being cooled and from environmental surfaces. Additionally, this tramp oil may contain fine particulate matter, such as minute machine shavings or cuttings known as fines. These fines may range in size from 25 to 30 microns for heavy metals and up to approximately 75 microns for aluminum or lighter metals. These fines are typically suspended within oil bubbles contained in the mixed fluid, and thus are not always removed by the ultracentrifuge. However, the oil concentrator is suited for use without a centrifuge.

SUMMARY OF THE INVENTION

The present invention includes a tank having different chambers for separating fluids of differing specific gravities. The material enters a first chamber having an angled bottom within the tank. Within this first chamber an initial separation of the mixture takes place. The oil, will separate from and float effectively on the machine coolant which has a specific gravity very nearly equal that of water. Aeration is provided through an aeration inlet near the bottom of the first chamber. Air is provided in the form of many minute air bubbles injected into the mixture at a relatively low pressure. The aeration aids in the separation of oil from the coolant and helps oil particles containing metal fines and other contaminants rise to the surface of the fluid within the first chamber.

As the first chamber is generally full when the oil concentrator is activated, material floating on the surface within the first chamber immediately begins to flow into the main chamber through an opening. This opening is equipped with a flow quietener baffle which facilitates a smooth flow or transition of the material floating within the first chamber to the main portion of the tank. The quietener baffle minimizes any disturbance to the interface between the floating light weight material and the heavier machine coolant. As the floating oil progresses across the surface of the main body of the tank it approaches a waste oil outlet having its lowermost portion at or slightly above the interface between the light weight and heavy weight materials. The waste oil is then removed or "skimmed" from the tank by the waste oil outlet for storage, or reclamation.

Fluid flow within the tank continues as machine coolant passes through a torturous path formed by two vertical baffles. The first vertical baffle is affixed to the top of the tank and descends to within a short distance of the bottom, and is attached to the interior surface of both sides of the tank. The second baffle is affixed to the bottom of the tank and ascends to within a short distance of the top of the tank. The top of the second baffle defines the level of fluid contained within the main portion of the tank. Machine coolant then will spill over the upper limit of the second baffle into a clean coolant storage chamber where it is immediately removed through a clean fluid outlet. The second baffle is equipped with an agglomeration baffle on its upper edge. This baffle extends toward the first vertical baffle in a direction approximately forty-five degrees below a horizontal plane. This agglomeration baffle helps in the agglomeration of any remaining fluid of light specific gravity which has survived the torturous path. This agglomeration takes place because of a velocity differential caused by the reduced area through which the fluid is forced to flow near the agglomeration baffle.

These and other aspects and advantages which characterize the present invention are pointed out with particularity in the claims attached hereto and forming a part hereof. However, for a better understanding of the invention, its advantages, and objects attained by its use, reference should be had to the drawings which form a further part hereof, and to the accompanying descriptive disclosure, in which there is illustrated and described a preferred embodiment of the invention.

BRIEF DESCRIPTION OF THE DRAWING

FIG. 1 is a top plan view of the present invention;

FIG. 2 is a right side view showing the relative position of the inlet and outlet ports;

FIG. 3 is a cross-sectional view of the present invention as seen generally along line 3—3 in FIG. 1;

FIG. 4 is a partial cross-sectional view of the present invention as seen generally along line 4—4 in FIG. 1; and FIG. 5 is a fragmentary elevational view showing an alternate oil exit port on an enlarged scale.

DESCRIPTION OF THE PREFERRED EMBODIMENT

Referring now to the drawings, wherein like reference numerals are used throughout the several views to indicate the same or similar elements of the invention, the oil concentrator 10 is shown comprising a fluid tight tank 12. The tank 12 has a bottom side 14, and generally vertical first and second end walls 16 and 18, respectively. The tank 12 further has a front and a back side wall, 22 and 24, respectively (see FIG. 1). The side and end walls rise to a common edge 26 which encircles the entire tank 12 a uniform distance above the bottom side 14.

Within the tank 12 angled baffle plate 28 defines a first chamber 32 having a generally angled or sloping bottom 34 (see FIG. 3). Fluid to be separated, containing machine coolant, tramp oil, and contaminants, enters first chamber 32 through an inlet port 36. Inlet port 36 is a pipe or other structure for transporting the oil and coolant mixture from a holding tank or centrifuge filter or other vessel (not shown). Inlet port 36 is supported by an inlet support plate 82 which extends between the front and back side walls 22 and 24 (see FIGS. 1 and 4). The mixed material enters the first chamber 32 where it undergoes initial separation. This separation segregates oil from the mixture into an upper "light" layer and machine coolant into a lower "heavy" layer. This separation is caused by the differing specific gravities of oil and machine coolant. The two layers form an interface 46, representing the common boundary between the oil and the coolant. This initial separation is improved by a trumpet like flange 38 which helps spread material exiting the inlet port 36 to the sides of the first chamber 32. The mixture of coolant and contaminants passing through the flange 38 then contacts the sloping bottom 34 of the angled baffle plate 28. This contact also encourages any solids within the mixture to settle to the bottom of the first chamber 32. This contact changes the direction of flow of the liquids and encourages the tramp oil to rise to the surface. It is important for this contact to be gentle so that solid particles and other contaminants are carried to the surface to be removed from the tank with the tramp oil. Only particles too large to remain with the tramp oil should settle to the bottom and remain in first chamber 32.

Oil particles containing metal fines or shavings are encouraged to rapidly rise to the surface of first chamber 32, and remain with the oil layer above interface 46 in main chamber 52, by the injection of minute bubbles 62 into first chamber 32 through aeration inlet 84. Aeration is accomplished by injecting air into the mixture at a relatively low pressure. Pressures of 2 to 3 pounds per square inch are found to be satisfactory. The size of the aeration bubbles 62 is decreased by passing the air through sintered bronze filter screen 68 or a similar device. Ideally, the bubbles should be small in size so that they attach readily to small size oil globules within the mixture and rise to the surface gently. These bubbles should also permeate all of the first chamber 32. Larger bubbles would, of course, rise to the surface more rapidly and might disturb the formation of an oil/water interface within the first chamber 32. The injection of air under high pressure might contribute to foaming of the oil-coolant mixture, and form a scum which might interfere with the operation of the oil exit port 54. The injection of air into first chamber 32 increases the amount of contaminants which can be removed with the tramp oil. However, an amount of solid material, globular entrained fines, and other heavy matter may settle to the bottom of first chamber 32. These heavy contaminants may be removed through a drain plug (not shown) located in the first end wall 16 slightly above the junction of first end wall 16 and angled baffle plate 28. Alternatively, these 30 heavy contaminants may be removed when the tank 12 is drained, as is explained below.

Following the initial separation taking place within first chamber 32, the partially separated liquids egress or leave chamber 32 and enter or ingress main or third chamber 52. Main or third chamber 52 is relatively larger than first chamber 32 and contains the fluids as they undergo further separation. The chamber 52 is equipped with an oil exit or egress port 54 in the back side wall 24. The oil exit port 54 has its lowermost portion at or slightly above the interface 46, between oil 42 and machine coolant 44. This allows the oil exit port 54 to skim the lighter specific gravity liquid from tank 12.

The level of oil exit port 54 relative to the interface 46 can be "fine tuned" by manual adjustment of elbow 55 attached to oil exit port 54. Elbow 55 is a ninety degree pipe elbow which is threadably engaged to a nipple or other fitting. Elbow 55 can be adjusted on the nipple to allow oil exit port 54 to "skim" the fluid above interface 46 (see FIG. 5). This allows the effective level of oil exit port 54 to be located slightly above the interface 46. This adjustment is helpful as the level of the interface 46 within the tank 12 may change slightly with the volume of oil and the specific gravity of the oil within the tank 12 at any given time. For example, if the elbow 55 is positioned horizontal to oil exit port 54, the effective level of oil exit port 54 is unchanged. If however elbow 55 is twisted to lie above a horizontal plane, the effective level of oil exit port 54 is raised to the lowermost portion of the opening in elbow 55. Elbow 55 illustrates an alternative embodiment of oil exit port 54.

The partially separated liquids egressing or exiting the first chamber 32 and entering or ingressing the main or third chamber 52 pass through an opening 56 formed within the angled baffle plate 28. The opening 56 is equipped with a flow quietener baffle 58 directly beneath the opening 56. The quietener baffle 58 is generally planar, and descends from the lowermost portion of the opening 56 in a plane approximately fifteen degrees below a horizontal plane in a direction generally toward the second end wall 18 and towards the coolant reservoir or second chamber 66. The lowermost portion of the quietener baffle 58 is at or slightly below the level of the interface 46 between the oil 42 and the machine coolant 44 within the main chamber 52. The quietener baffle 58 facilitates a laminar flow of the partially separated mixture between the first chamber 32 and the main chamber 52. This laminar flow is important as it minimizes the disturbance to the interface 46 from fluid passing between the first chamber and the main chamber. This aspect of the invention will allow a more rapid separation of light and heavy materials than could be accomplished if the interface were disturbed. A more rapid separation allows for the processing of larger amounts of mixture within a smaller size tank, and more importantly will allow any metal fines or shavings suspended within the tramp oil to be efficiently removed through oil exit port 54 before the particles have time to precipitate to the bottom of tank 12.

Since the oil concentrator is essentially a closed vessel, the input of fluid through the inlet port 36 should equal the output of fluid through the oil exit port 54 when added to the amount of clean coolant removed from the tank. Clean fluid is removed through the clean coolant port 64 located in the second end wall 18 near the lower portion thereof. Clean coolant port 64 is constructed and arranged to drain the coolant reservoir 66 of its contents of clean coolant as rapidly as clean coolant passes over the second baffle 74.

Although the oil concentrator operates at atmospheric pressure, as the top of tank 12 is open, the oil concentrator could function with a lid or cover (not shown) to keep out dirt and the like.

The tank 12 is provided with a first vertical baffle 72 which is affixed between the front and back side walls 22 and 24, respectively, and depends from the edge 26 to within a short distance of the bottom side 14 (see FIG. 3). The first vertical baffle 72 cooperates with a second vertical baffle 74 to direct fluid exiting the main or third chamber into the relatively smaller second or reservoir chamber 66. The first and second baffles 72 and 74 form a torturous path for clean coolant egressing the main chamber 52 and ingressing coolant reservoir 66. In operation, it is anticipated that the vast majority of separation will take place within the first chamber 32 and the main chamber 52. Thus, practically no oily substances nor contaminants will pass the lowermost portion of first vertical baffle 72.

However, it is found that a small amount of oily contaminant may still survive the torturous path formed by baffles 72 and 74. Removal of this contaminant will be greatly enhanced by the operation of the agglomeration baffle 76. The agglomeration baffle 76 extends from the upper portion of the second vertical baffle 74 toward the first baffle 72. Additionally, it is found that the function of the agglomeration baffle 76 is enhanced when it extends more than one-half of the distance between the first and second baffles 72 and 74. Further, when the agglomeration baffle is given a descending angle of approximately forty-five degrees below the horizontal, agglomeration baffle 76 will have a "syphoning" effect upon the particulate matter and oily substances which pass underneath first vertical baffle 72.

The agglomeration baffle 76 causes oil globules and particulate matter suspended therein, to adhere to each other, mature and remain below baffle 76. These mature or enlarged oil globules formed from smaller globules will accummulate underneath baffle 76 and rise toward the upper end 78 of the second vertical baffle 74 as they are trapped beneath the agglomeration baffle 76. These enlarged globules often contain particles of solid material and fines, consequently, when fluid flow is decreased or stopped these mature particles may settle to the bottom of tank 12 for later removal during cleaning (see below).

The syphoning effect is caused by a transition zone adjacent to the end of the agglomeration baffle 76 nearest the first vertical baffle 72. This effect is caused by the constriction in the flow of fluid created as the coolant attempts to pass the agglomeration baffle 76. As the fluid passes through the constricted area it will increase its velocity so that the volume of coolant passing over the agglomeration baffle 76 is equal to the volume of coolant passing underneath the lowermost portion of first vertical baffle 72 minus any fluid removed by the agglomeration baffle 76. This increase in velocity will create the syphoning effect as oily globules having different specific gravities will experience acceleration at different rates compared to coolant fluid. Should the agglomerated material underneath the agglomeration baffle 76 accumulate to an unwanted extent, it may be removed from the tank 12 through the bleed hole 86. The bleed hole 86 is located in either the front or back side walls 22 and 24, respectively, underneath the agglomeration baffle 76 at the upper end 78 of the second vertical baffle 74. Alternatively, the contents of the main chamber 52 can be drained through drain plug 84 located in bottom side 14 near baffles 72 and 74.

In operation, it is expected that the contents of the tank 12 should be drained periodically through drain plug 90. The entire interior surface of the tank 12, including the first chamber 32, the main chamber 52 and the coolant reservoir 66 should be hygienically cleaned at this time to remove bacteria and contaminants remaining within the oil concentrator. It is expected that this procedure will be necessary only every few months, or when the coolant within the oil concentrator becomes discolored. The oil concentrator should then be recharged with clean coolant prior to being placed back in service.

For the oil concentrator to operate most efficiently, it is important that the oil exit port 54 be located relative to the second vertical baffle 74 so that the lowermost portion of oil exit port 54 is no lower than a horizontal plane passing through the uppermost portion 78 of second vertical baffle 74. This geometry is desired because the oil/water interface 46 will lie in a horizontal plane at the level of the upper portion 78 of the second vertical baffle 74. Further, the quietener baffle 58 should extend downwardly at least to this horizontal plane so that fluid passing over the flow quietener baffle 58 will remain in contact with the flow quietener baffle 58 at least until it contacts the interface 46. It is also important that the upper portion of the second vertical baffle 74 be "level" from the front side wall 22 to the back side wall 24 so that the second vertical baffle acts as a dam, and coolant spills over the length of the upper portion of second vertical baffle 74. The oil concentrator disclosed should work suitably when constructed to hold approximately 20 U.S. gallons or 80 liters of fluid. With this dimension a flow rate of 1 to 2 gallons of fluid per minute should be possible. Certainly larger or smaller concentrators could be built to handle larger or smaller flow rates.

The present invention provides a structure for efficiently and thoroughly cleaning tramp oil and contaminants from machine coolant. This is accomplished by ensuring that fluid flow through the tank is accomplished with a minimum of disturbance to the interface between the floating light material and the heavier material. The rapid and thorough cleaning of the coolant is facilitated by the employment of a tank having three compartments with a quietener baffle located between the first compartment and the main compartment, a torturous path between the main compartment and the clean coolant storage compartment, and an agglomeration baffle between the main and storage compartments. Further, the flow quietener baffle is arranged within the tank so that material flowing from the first compartment to the main compartment will flow generally down the quietener baffle and arrive in the main compartment, substantially at the level of the interface between the floating light material and the heavy material. Rapid and complete floatation of oily material containing heavy contaminants is achieved by the addition of aeration bubbles within the first compartment.

A number of characteristics and advantages of the invention have been set forth, together with the structure and operation of the invention. The novel features thereof are pointed out in the following claims. The above disclosure is merely illustrative, and changes may be made in detail with respect to shape, size, and structural arrangement within the principles of the invention to the full extent intended by the broad general meaning of the terms expressed in the claims.

What is claimed is:

1. An oil concentrator for separating a fluid comprising: a fluid tight tank having a first chamber with a sloping bottom; a second chamber opposite said first chamber; a third chamber between said first and second chambers; means for allowing mixed fluid containing heavy and light fluids to ingress said first chamber; means for allowing egress of said fluids from said first chamber and ingress into said third chamber; first baffle means located within said third chamber for directing the flow of fluid between said third chamber and said second chamber; second baffle means separating said third and said second chambers; said second baffle means including means for agglomerating material within said fluid located near an upper edge of said second baffle means; a light fluid outlet located within said second chamber; a heavy fluid outlet located within said third chamber, and; means for aerating the contents of said first chamber, located within said first chamber.

2. The oil concentrator as defined in claim 1 further comprising a flow quietener baffle disposed directly beneath said first chamber fluid egress means, said quietener baffle being generally planar and descending at a angle approximately fifteen degrees below a horizontal plane and extending in a direction generally toward said second chamber.

3. The oil concentrator as defined in claim 1 wherein said tank has a bottom and an upper edge; said first baffle means includes a first vertical baffle having a bottom portion fixed in spaced relation to said tank bottom and extends to said upper edge of said tank; and said second baffle means includes a second vertical baffle having an upper portion fixed in spaced relation from said upper edge and extending to said bottom of said tank.

4. The oil concentrator as defined in claim 3 wherein said means for agglomerating material includes an agglomeration baffle plate affixed to an upper portion of said second baffle and extends toward said first baffle a distance greater than one half the distance between said first and second vertical baffles and lies in a plane descending from said upper portion of said second baffle approximately forty-five degrees below a horizontal plane.

5. The oil concentrator as defined in claim 2 wherein said flow quietener baffle extends in a direction generally toward said second chamber at least to intersect a horizontal plane passing through said upper portion of said second baffle.

6. The oil concentrator as defined in claim 1 wherein said means for aerating the contents of said first chamber includes means for dispersing air into said mixture within said first chamber in the form of fine bubbles which rise slowly through said fluid and substantially permeate the contents of said chamber.

7. The oil concentrator as defined in claim 6 wherein said means for aerating further includes a metal strainer forming a multitude of aeration holes.

8. The oil concentrator as defined in claim 1 wherein said means for allowing fluid to ingress said first chamber includes a trumpet like flange affixed to the open end of a vertically positioned transport vessel.

9. The oil concentrator as defined in claim 1 further comprising means for draining the contents of said third chamber located within said third chamber.

10. The oil concentrator as defined in claim 1 further comprising means for adjusting the effective level of said light fluid outlet affixed to said light fluid outlet.

11. The oil concentrator as defined in claim 10 wherein said means for adjusting the effective level of said light fluid outlet includes an elbow threadably engaged within said tank to said light fluid outlet.

12. A waste oil concentrator for receiving and separating a mixture of oil and machine coolant comprising: a fluid tight tank having a bottom, a first end wall joined to said bottom and ascending vertically therefrom to an upper limit defining an upper edge, said upper edge encircling said tank a uniform distance from said bottom, a front side wall joined to said bottom and said first end wall and ascending vertically to said upper edge, a second end wall joined to said front side wall and said bottom and ascending vertically to said upper edge, a back side wall joined to said first and second end walls and to said bottom, and ascending vertically to said upper edge; a first chamber defined by an angled baffle plate affixed in fluid tight contact to said front and back side walls near said first end wall and having an upper portion positioned parallel to said first end wall, said upper portion of said baffle plate depending vertically from said upper edge for a predetermined distance, said angled baffle plate having a lower portion extending in a plane approximately forty five degrees below a horizontal plane and making a fluid tight contact with said upper portion and said first end wall; ingress means for introducing fluid containing oil and coolant into said first chamber said ingress means including a mounting plate extending between said front and back side walls near said first end wall; said angled baffle plate having means for egressing said fluid and means for quietening said egressing flow positioned adjacent said means for egressing; a first vertical baffle, extending between said front and back side walls and depending parallel to said second end wall, from said upper edge a distance less than the distance between said upper edge and said bottom near said second end wall; a second vertical baffle extending between said front and back side walls and ascending parallel to said second end wall from said bottom a distance less than the distance between said upper edge and said bottom, said second vertical baffle located between said first vertical baffle and said second end wall and having an upper edge; an agglomeration baffle affixed to said upper edge of said second vertical baffle and extending in a direction generally toward said first vertical baffle, said agglomeration baffle extending from said front wall to said back wall; means for allowing light fluid to egress said tank positioned in one of said side walls, between said first vertical baffle and said angled baffle plate, and; means for allowing heavy fluid to egress said tank positioned in said second end wall near said bottom.

* * * * *